RF SIGNAL DISTRIBUTION STATION

Filed July 15, 1966 2 Sheets-Sheet 1

INVENTOR.
FRANK J. RAGONE
ERIC WINSTON

BY Hopgood & Calimafde
ATTORNEYS

INVENTOR.
FRANK J. RAGONE
ERIC WINSTON
BY
Hopgood & Calimafde
ATTORNEYS

United States Patent Office 3,359,460
Patented Dec. 19, 1967

3,359,460
RF SIGNAL DISTRIBUTION STATION

Frank J. Ragone, Pennsauken, N.J., and Eric Winston, Melrose Park, Pa., assignors to Jerrold Electronics Corporation Filed July 15, 1966, Ser. No. 565,530
10 Claims. (Cl. 317—99)

ABSTRACT OF THE DISCLOSURE

A television signal distribution station having modularized construction for use in CATV systems. The module station interrupts the trunk cable and affords selective feeder line distribution of signal and power by employing interchangeable and rotatable pluggable submodules. The trunk station is weatherproof and RF shielded by the use of concentric gaskets in the flanged portion of the module, but affords access through weathertight fittings for testing purposes.

This invention relates to television signal distribution in general, and in particular, to a novel modularized trunk station of interrupting cable type for use in community antenna television systems, commonly abbreviated CATV.

Power levels at various points in the CATV systems are of primary importance and form the technical basis of the system operation. The antenna output must be sufficiently high to provide noise-free pictures. The amplifier output must, on the other hand, minimize system noise and cross modulation. Coupled to the foregoing is the distribution problem where an RF signal carrying main trunk cable is tapped by a plurality of feeder lines each serving one or more individual subscribers, and each having problems analogous to those facing the trunk line itself. Auxiliary feeder line equipment and cascaded trunk amplifiers may or may not be required, and accordingly, AC power may or may not be necessary beyond the distribution points to the feeders and further amplifiers. Reflection must be minimized, and accordingly, impedance matching must prevail throughout the distribution. Moreover, since the majority of the systems which fulfill such functional requisites will be exposed to weather, the construction must be such as will stand up under any ambient conditions, and also be sufficiently flexible as to attitude to allow various mounting positions and accessible ports for trunk and feeder cable entry.

The foregoing are only illustrative of the problems presented in the forwarding and distributing of a television signal between the antenna and the subscribers. This invention is directed to such problems and to fulfilling the objects which follow.

It is the object of this invention to provide a CATV trunk station of modularized construction, having a weatherproof and radiation-proof housing which may be affixed to a messenger cable or pole in a plurality of attitudes.

It is another object of this invention to provide a station of the foregoing type with the capability of distributing a trunk received RF signal to a plurality of feeder cables each properly matched and extending in a direction which will minimize feeder cable run and bending.

It is a further object of this invention to accomplish the immediate foregoing object with an arrangement which allows extremely simple field modification of the unit to accommodate distribution feeder lines in varying numbers and direction, properly matched and with minimum loss of energy.

It is a further object of this invention to distribute an RF or TV signal from trunk to trunk and trunk to feeder line, and to simultaneously accommodate the AC power necessary for energizing local equipment, feeder line equipment and down line trunk equipment on a selective basis. Thus, it is desirable to provide at least the four following functions:

(1) Trunk station powered through input terminals; power dead-ended.

(2) Trunk station powered through output terminals; power dead-ended.

(3) Station powered through either input or output terminals and power passed to feeder and down line trunk stations.

(4) Station unpowered; but power passed through.

It is a further object of this invention to satisfy the immediate foregoing object with a simple and positive power switching arrangement allowing field modification of the unit to accomplish the selected objective.

It is a still further object of this invention to provide housing which is not only radiation and weatherproof as mentioned, but which is further easily openable to expose the internal parts to maintenance, and which further includes external vantage points through which the internal components may be tested without opening the unit.

The above mentioned and other features and objects of this invention and the manner of attaining them will become more apparent and the invention itself will best be understood by reference to the following description of embodiments of the invention taken in conjunction with the accompanying drawings wherein.

Figure 2:
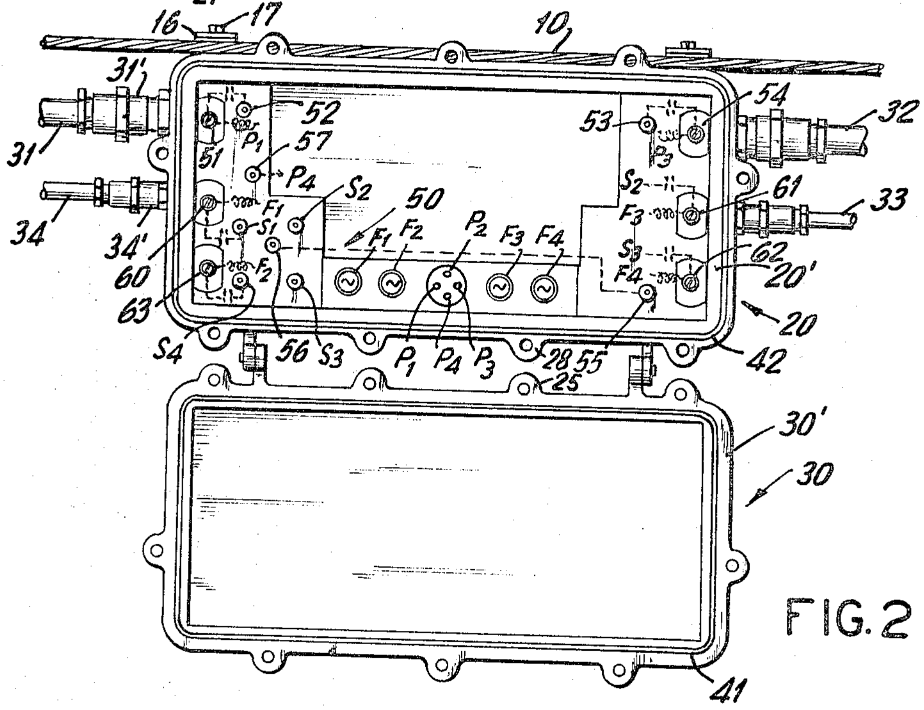
FIG. 2 illustrates (with minor cable modification) the station of FIG. 1 open for maintenance with the plug-in amplifier module, splitter module, and AC plug removed.
Figure 4A:
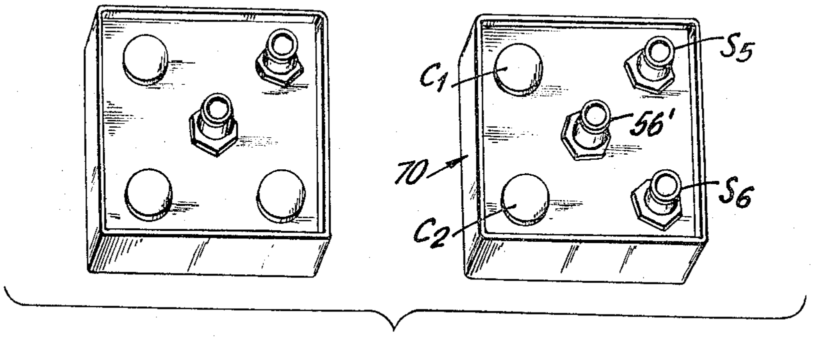
Figure 4B:
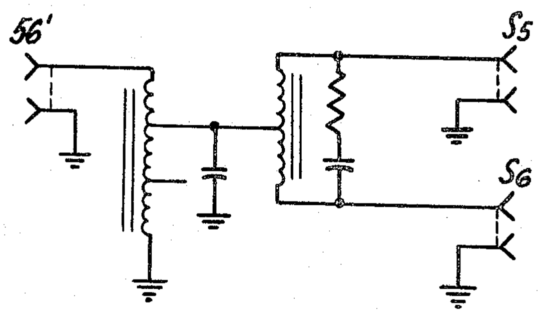

FIG. 4*a* is a perspective illustration of two module splitter embodiments to be mounted alternatively upon the chassis shown in FIG. 2;

FIG. 4*b* is an electrical schematic of one of the splitters shown in FIG. 4*a*.

Figure 5A:
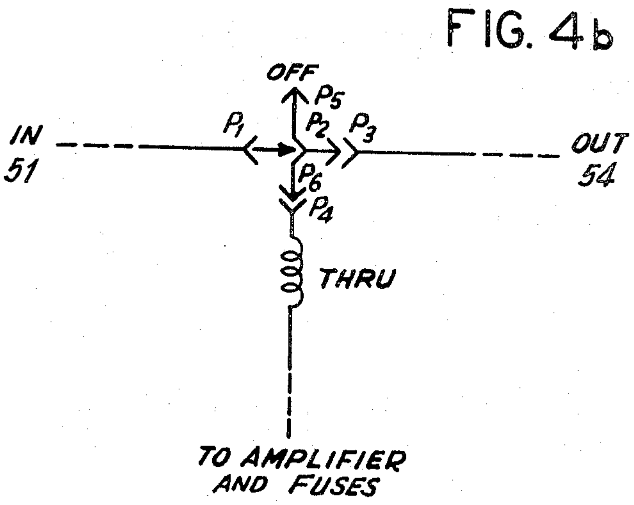
Figure 5B:
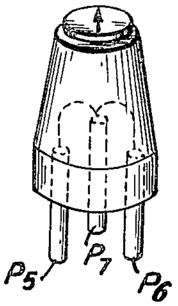

FIG. 5*a* is a schematic illustration of the plug and socket controlling AC power; and FIG. 5*b* is a perspective illustration of the plug shown schematically in FIG. 5*a*.

The invention will now be described in detail with reference first to the perspective illustration of the exterior housing in FIG. 1.

As may be seen from the figure, the trunk station housing may be suspended vertically from a messenger cable 10. For this purpose, a pair of clamp and bolt assemblies 11 and 12 are provided. Each assembly (and the one on the left has been chosen for purposes of explanation) comprises a base member 13 affixed to the housing exterior by a pair of screws 14 and 15. The messenger cable is grasped between the base member 13 and the clamp head 16 by virtue of a hexagonal linking bolt 17 threaded into a base member flange. For flexibility in mounting, additional screw holes are provided in flanges 18 and 19, shown in phantom, on the back side of the housing attitude. The foregoing clamping arrangement allows four housing positions (two orthogonal and two with hinges reversed).

Where the housing is to be used in above-ground installations, a cast-aluminum body has been found to be preferable; underground systems should preferably be made of cast-iron. The housing is constructed in two main portions, including a base member 20 and a cover 30 hingedly coupled to the former via a pair of hinge members 21 and 22. Hexagonal bolts 23, 24, etc. surround the housing periphery passing through apertures in the cover flanges 25, 26, etc. and being threaded into cooperating base flanges 28, 29, etc. The tightening of these bolts, as will be described, affords the requisite weather and RF radiation proofing.

The housing is designed for the direct introduction of aluminum sheathed or polyethylene jacketed cables, such as 31 through 36, with the requisite weatherproofing and grounding being afforded by hardened metal grounding bushings (for example, 38) in conjunction with connectors 31' through 36'. These bushings may, for example, be made of stainless steel deformably inserted into apertures into the aluminum housing as explained in application Ser. No. 565,534 filed July 15, 1966 to the same assignee.

Ports in addition to those affording the foregoing feeder line exits and trunk line inputs and outputs are provided for the external testing of the internal circuit components. Threaded plugs 40, 41 and 42 are provided for sealing these apertures (formed similarly to those above) when not in use.

Figure 1:
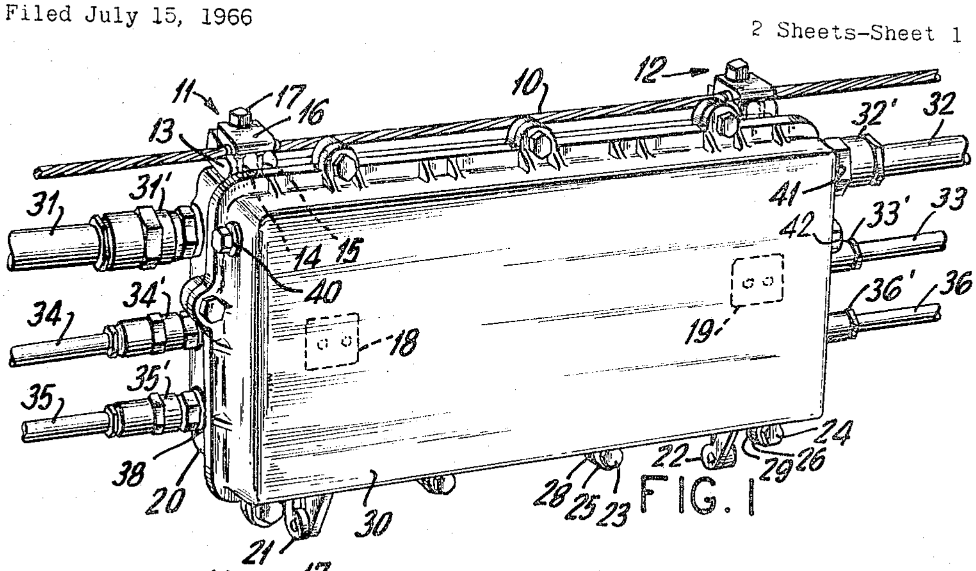
FIG. 1 is a perspective illustration of the inventive trunk and distribution station shown vertically mounted and depending from a messenger cable.

FIG. 2 shows the housing of FIG. 1 with cover 30 displaced angularly downwardly 180° to expose the interior. In this figure the amplifying module, splitter module, and AC plug have been removed for simplicity and are shown separately in FIG. 3, 4*a* and 5*b* respectively. As may be seen clearly in this figure, the cover and base include corresponding flanges 30' and 20' respectively. Each of these flanges includes a circumferential channel within which gaskets 41 and 42 are arranged respectively. Gasket 41 is of cylindrical braided metal construction allowing it to be compacted upon the closure of the cover and base members and subsequent tightening of the hexagonal bolts. This affords an RF radiation proofing for the unit. Gasket 42 on the other hand is disposed externally and concentrically to radiation gasket 41, and is composed of soft rubber to weather seal the entire unit. By disposing this gasket externally to the radiation proofing gasket, the latter is also weatherproofed.

Mounted upon suitable standards within the base member 20 is the connector chassis indicated generally at 50. This chassis, as will be explained, serves as the intermediary between the amplifier module of FIG. 3 and the trunk and distribution signals. For purposes of simplicity, the explanation which follows shall be divided into portions directed to tracing the RF and AC power energy respectively.

Figure 3:
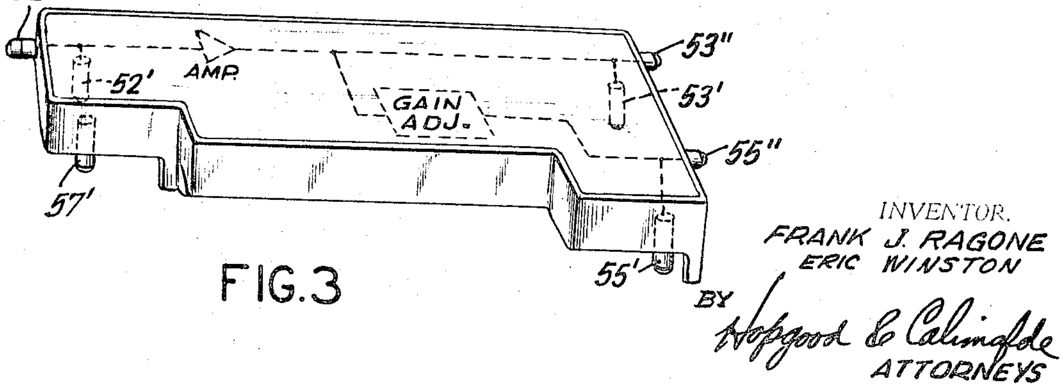
FIG. 3 is a perspective illustration of the module amplifier carried by the internal chassis shown in FIG. 2.

The RF energy arrives at the unit via the main trunk cable 31; the cable center conductor being ohmically and mechanically connected to the crown washer terminal assembly 51. This terminal is capacitively coupled (as shown in phantom) to the connector fitting 52 which, as will be explained, serves as a mate to a correspondingly insertably connector 52' on the amplifier module (FIG. 3). The amplifier module, as shown in phantom, amplifies the RF signal input, feeding a major portion to its output terminal 53'. This terminal of the module mates upon module insertion with connector terminal 53 on the connector chassis which is capacitively coupled to trunk output terminal 54; the latter being similarly formed of a crown washer assembly to seize the bare center conductor of the outgoing trunk cable. A portion of the amplified signal is adjusted gainwise, the parameters depending upon subscriber distances, etc., and is made available at module terminal 55' which mates with connector chassis terminal 55. Distribution terminal 55 is coupled (as shown in phantom) within the connector chassis to a second distribution terminal 56.

Terminal 56 in a manner to be explained and with the aid of an auxiliary plug-in splitter (examples of which are shown in FIG. 4*a*) distributes the RF signal selectively among terminals $S_1$ through $S_4$. This may be accomplished to 1, 2, 3 or 4 of these terminals and regardless of the number, to the particular terminals desired. Terminal $S_1$ is coupled to feeder output terminal 60; $S_2$ to feeder output terminal 61; $S_3$ to feeder output terminal 62; and $S_4$ to feeder output terminal 63 by coaxial conductor cable within the connector chassis.

Precisely how the distribution is effected will be explained with reference to FIGS. 4*a* and 4*b*. FIG. 4*a* shows two examples of plug-in splitters adapted to cooperately mate with terminals $S_1$ through $S_4$ and center terminal 56 on the connector chassis. The plug-in splitters serve to establish 1, 2, 3 or 4 feeder line distributions, depending upon the particular splitter used. The splitter at the left in FIG. 4*a* is an example of distribution to one feeder line, the splitter at the right in FIG. 4 would couple to two feeder lines. For simplicity, only the splitter shown at the right will be discussed hereinafter.

Each splitter contains an electrical network which serves to split the incoming energy available at the center connector fitting 56 to the peripherally located connector terminals whose number depends upon the particular splitter. An example of an electrical network which would effect such a result in shown in FIG. 4*b*, which corresponds to the splitter on the right in FIG. 4*a*. As will be understood by those versed in the art, the network of FIG. 4*b* serves to split incoming energy while at the same time eliminating discontinuities and impedance matching the respective terminals looking in and out. The network of FIG. 4*b* is contained in a housing 70 (FIG. 4*a*) equipped with connector fittings 56', $S_5$ and $S_6$ which mate with fittings 56 and $S_1$ through $S_4$ of the connector chassis. It bears mentioning at this point that the prime (') designations utilized elsewhere to designate mating terminals have been omitted from the peripheral terminals of the plug-in splitter. The reason for this is that terminals $S_5$ and $S_6$ may mate with any combination of adjacent terminals $S_1$ through $S_4$ on the connector chassis in order to allow feeder line coupling at the most accessible housing terminal. Thus, for example, if it is desirable as shown in FIG. 2 to connect feeder line solely to terminals 60 and 61, then the plug-in splitter would be positioned with $S_1$ opposite $S_6$ and $S_2$ opposite $S_5$ for mating engagement. Since connector chassis terminal 56 always mates with the corresponding plug-in splitter fitting, the latter has been designated with a prime notation.

Thus, it may be seen that distribution to feeder line terminals may be flexibly effectuated by a symmetrical module whose rotation affords a simple altering of the effected feeder terminals. Caps $C_1$ and $C_2$ are merely expedient means for plugging unused apertures in the plug-in splitter, and no energy need be lost in dummy loading unused terminals.

The plug-in module of FIG. 3 is as mentioned essentially an amplifier. It is preferably made up of solid state components on printed circuit boards built into shielded chassis compartments. Included could be such circuit facilities as a switchable attenuator, a switchable cable equalizer, and gain and tilt controls both trunk output and bridging outputs permitting adjustment of the amplifier for obtaining the desired operating parameters. Test fittings are provided for checking the trunk input (52''), the trunk output (53'') and distribution output signal (55''). These terminals are accessible through the described capped apertures 40, 41 and 42 respectively, to permit testing without opening the housing.

Included in the amplifier module is a power supply (not shown specifically) containing the usual rectifier, filter and regulating networks necessary for transforming a low voltage AC input into the DC output required by the solid state amplifier stages. A plug-in switch, whose functioning will be described, permits the establishment of AC input and by-pass conditions desired for the particular trunk station location. AC power can thus be applied to the station either through the input or through the output terminals (the latter for where the power is supplied from a down line facility) with the further feature of supplying or not, as desired, equipments ahead of or past the station. Alternatively, AC power to the station itself can be by-passed.

In FIG. 2 there is shown a four-pinned socket whose terminal connections are designated $P_1$ through $P_4$ respectively. Cooperating with the socket is a three-pinned plug having terminals $P_5$ through $P_7$ as shown in FIG. 5*b*. By variously positioning the plug in any one of four orthogonal directions (pointed at the respective pin sockets), the foregoing objectives may be selectively met as described below.

Incoming AC power available at terminal 51 is coupled through an RF choke to terminal $P_1$ of the four-pinned socket (FIGS. 2 and 5*a*). Terminal 54, on the other hand, is coupled through an RF choke to pin $P_3$. Pin $P_4$ is coupled to connector chassis terminal 57 which mates with terminal 57' of the amplifier module suppling AC to its rectifier and DC power producing circuits. Terminal $P_4$ is further coupled via fuses $F_1$, $F_2$, $F_3$, and $F_4$ to terminals 60 and 62, respectively, through RF chokes. Thus, as shown schematically in FIG. 5*a*, orthogonal positioning of the plug allows power from 51 to be transferred to the local amplifier and feeder lines (arrow pointed downwardly) or directly out by-passing both feeder lines and amplifier (arrow pointed up). The example shown in FIG. 5*a* illustrates an arrangement where power available from outgoing terminal 54 is passed to the amplifier and fused feeder lines, but not to the input terminal.

It may be noted that with the described arrangement separate RF and AC power paths are utilized throughout with chokes and decoupling capacitors being appropriately disposed to eliminate the undesirable energy.

It may thus be seen that the inventive CATV distribution station achieves maximum cascade ability, flexibility, reliability, and a facility of maintenance and accessibility heretofore unavailable.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. An RF signal distribution station containing electrical components connected to form a functionally complete electrical unit, comprising: a metal housing including a base and cover; circumferentially continuous coextending flanges on said base and cover; means cooperating with said flanges for securing said cover to said base; a plurality of electrical connector fittings disposed at opposite ends of said base, for receiving coaxial cable connectors and being connected to said base to provide a water-tight seal and a continuous electrical connection therewith; an electrical component-carrying chassis within said base adjacent said fittings and including terminal means coupled electrically to said fittings and with the received cable connectors; a first set of electrical connectors mounted on said chassis; means coupling said last mentioned connectors and said terminal means; and an electrical modular unit disposed in one of said cover and base and provided with a complimentary set of mating connectors pluggable into said chassis for transferring RF energy between predetermined chassis terminals.

2. The station according to claim 1 wherein: one of said fittings is for receiving an interrupted trunk line representing the input to said station, a second of said fittings is located at the opposite end of said base for connection to the outgoing part of the interrupted trunk line and the remaining fittings are for feeder lines for distributing energy tapped from the trunk line to substations; said station further comprising a second set of connectors mounted on said chassis; means, including said modular unit, for coupling a given one of said connectors of said second set to the terminal means associated with said input trunk line fitting; means for coupling the other contacts of said second set respectively with the terminal means associated with said remaining fittings; and a demountable second modular unit for splitting the RF energy into paths corresponding to the number of feeder lines, said second modular unit being provided with connectors mating with a given number of connectors in said second set, the number depending on the number of feeder lines.

3. The station according to claim 2, further comprising; a circumferentially continuous weather gasket mounted in a channel in one of said cover and base flanges; and a radio-frequency circumferentially continuous shield mounted in a second channel in the other of said housing flanges, said weather gasket being outwardly located relative to said shield; whereby the shield and interior of the housing are protected against moisture when said flange cooperating means are secured.

4. The station according to claim 3 further comprising: test connectors on said first mentioned electrical modular unit disposed opposite sealable access ports in said cover whereby said module may be tested with said housing closed.

5. The station according to claim 2 further comprising: a pair of messenger clamps removably affixed to one peripheral end of said base, the opposite peripheral end of said base including means for hingedly coupling said cover and base whereby when said station is suspended from a messenger cable via said clamps, said cover may be opened pivotally downward to expose the entire interior.

6. The station according to claim 5 further comprising: means orthogonally located with respect to said peripheral end of said base for mounting said cable clamps thereon.

7. In a station for distributing a trunk cable carried RF signal to subscriber feeder cables, the improvement comprising: a chassis; a first connector mounted on said chassis; means for coupling said connector to said trunk cable; a plurality of outgoing feeder cable terminals; a plurality of second connectors mounted on said chassis symmetrically disposed with respect to said first connector each being respectively coupled to a feeder terminal; and a signal splitter module demountably positioned on said chassis, said module including, a complementary first connector for mating engagement with said chassis mounted first connector, and at least one second connector coupled to said complementary connector and located a distance therefrom equal to the symmetrical distance of said chassis mounted second connectors from said chassis mounted first connector for engaging at least one of said chassis mounted second connectors, the connector engaged being dependent upon the angular position of said module thereby rendering effective predetermined feeder terminals depending upon the number of said module connectors and the angular position of said module.

8. The station claimed in claim 7 in which there are four feeder terminals peripherally disposed on said station and four second connectors symmetrically disposed on said chassis at the respective corners of an imaginary square, and in which said module includes between one and four module second connectors disposed about said complementary module connector.

9. In a distribution station having a module amplifier and input and output trunk and feeder line terminals, the improvement for distributing AC power available over either one of an input or output trunk cable selectively to the other of said trunk cables as well as the feeder lines and station amplifier comprising: a multipin socket having a plurality of connectors; means coupling predetermined socket connectors to said feeder terminals, trunk terminals and amplifier; and a plug having pins disposed for mating engagement with said socket in a plurality of positions, said plug pins being fewer in number than those connectors in said socket and being in electric common.

10. The improvement claimed in claim 9 wherein there are four socket connectors, the first being coupled to the input trunk terminal, the second to said feeder line terminals, the third to said output trunk terminal and the fourth being blank, said plug including three pins.

References Cited

UNITED STATES PATENTS

| | | | |
|---|---|---|---|
| 1,336,801 | 4/1920 | Wassell | 339—18 |
| 2,462,489 | 2/1949 | Hallett | 317—99 X |
| 3,138,653 | 6/1964 | Miller | 174—59 X |

FOREIGN PATENTS

| | | |
|---|---|---|
| 232,450 | 4/1925 | Great Britain. |

ROBERT S. MACON, *Primary Examiner.*

ROBERT K. SCHAEFER, *Examiner.*

M. GINSBURG, *Assistant Examiner.*